(12) United States Patent
Yao et al.

(10) Patent No.: US 12,052,483 B2
(45) Date of Patent: Jul. 30, 2024

(54) PHOTOGRAPHING DEVICE AND COMMUNICATION DEVICE

(71) Applicant: Huawei Technologies Co., Ltd., Shenzhen (CN)

(72) Inventors: Xidong Yao, Shenzhen (CN); Yeren Wang, Dongguan (CN); Bingbing Tong, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 179 days.

(21) Appl. No.: 17/727,231

(22) Filed: Apr. 22, 2022

(65) Prior Publication Data

US 2022/0247895 A1 Aug. 4, 2022

Related U.S. Application Data

(63) Continuation of application No. PCT/CN2020/122772, filed on Oct. 22, 2020.

(30) Foreign Application Priority Data

Oct. 22, 2019 (CN) .......................... 201911007167.X

(51) Int. Cl.
*H04N 23/52* (2023.01)
*H04N 23/51* (2023.01)
(Continued)

(52) U.S. Cl.
CPC ............. *H04N 23/52* (2023.01); *H04N 23/51* (2023.01); *H04N 23/55* (2023.01); *H04N 23/665* (2023.01)

(58) Field of Classification Search
None
See application file for complete search history.

(56) References Cited

U.S. PATENT DOCUMENTS 4,984,089 A * 1/1991 Stiepel .................. G03B 17/08
348/E7.087
5,689,304 A * 11/1997 Jones ..................... H04N 7/181
348/E7.086
(Continued)

FOREIGN PATENT DOCUMENTS

CN 102736369 A 10/2012
CN 102818159 A 12/2012
(Continued)

OTHER PUBLICATIONS

English translation of CN-209767660-U, Li, Dec. 2019 (Year: 2019).*
(Continued)

*Primary Examiner* — James M Hannett
(74) *Attorney, Agent, or Firm* — Conley Rose, P.C.

(57) ABSTRACT

A photographing device includes a housing configured to carry an electronic component of the photographing device, such as a lens system and an expansion system. A lens cavity and an expansion cavity isolated from each other are disposed in the housing. The lens system is disposed in the lens cavity, a heat dissipation apparatus is disposed in the expansion cavity, and the expansion system is disposed on the heat dissipation apparatus and is thermally coupled to the heat dissipation apparatus. In addition, the disposed heat dissipation apparatus is further thermally coupled to the lens system. A heat dissipation channel isolated from the expansion cavity is disposed in the heat dissipation apparatus.

20 Claims, 7 Drawing Sheets

(51) Int. Cl.
*H04N 23/55* (2023.01)
*H04N 23/60* (2023.01)

(56) References Cited

U.S. PATENT DOCUMENTS

| | | | | |
|---|---|---|---|---|
| 6,061,087 A | * | 5/2000 | Schieltz | G08B 13/19619 |
| | | | | 348/151 |
| 8,385,065 B2 | * | 2/2013 | Weaver | G03B 37/02 |
| | | | | 165/122 |
| 10,842,042 B2 | * | 11/2020 | Kim | H05K 7/20154 |
| 2008/0164316 A1 | | 7/2008 | Patel et al. | |
| 2018/0006362 A1 | | 1/2018 | Williams | |
| 2018/0206362 A1 | | 7/2018 | Vadillo et al. | |
| 2018/0210521 A1 | | 7/2018 | Kilgore et al. | |
| 2018/0263104 A1 | | 9/2018 | Hamada et al. | |
| 2019/0174030 A1 | | 6/2019 | Kojima | |
| 2021/0368082 A1 | * | 11/2021 | Solar | H04N 23/51 |

FOREIGN PATENT DOCUMENTS

| | | | |
|---|---|---|---|
| CN | 103037041 A | | 4/2013 |
| CN | 204697165 U | | 10/2015 |
| CN | 105487603 A | | 4/2016 |
| CN | 105721747 A | | 6/2016 |
| CN | 106500854 A | | 3/2017 |
| CN | 206181187 U | | 5/2017 |
| CN | 206294249 U | | 6/2017 |
| CN | 207457675 U | | 6/2018 |
| CN | 207543209 U | | 6/2018 |
| CN | 108513630 A | | 9/2018 |
| CN | 109068542 A | | 12/2018 |
| CN | 109274881 A | | 1/2019 |
| CN | 208424564 U | * | 1/2019 |
| CN | 208890915 U | | 5/2019 |
| CN | 208937887 U | | 6/2019 |
| CN | 110288840 A | | 9/2019 |
| CN | 209767660 U | * | 12/2019 |
| CN | 209767660 U | | 12/2019 |
| IN | 105323437 A | | 2/2016 |
| JP | 2019179054 A | | 10/2019 |
| JP | 2019179942 A | | 10/2019 |
| KR | 20140131138 A | | 11/2014 |

OTHER PUBLICATIONS

English translation of CN-208424564-U, Chen, Jan. 2019 (Year: 2019).*

* cited by examiner

PHOTOGRAPHING DEVICE AND COMMUNICATION DEVICE

CROSS-REFERENCE TO RELATED APPLICATIONS

This is a continuation of International Patent Application No. PCT/CN2020/122772 filed on Oct. 22, 2020, which claims priority to Chinese Patent Application No. 201911007167.X filed on Oct. 22, 2019. The disclosures of the aforementioned applications are hereby incorporated by reference in their entireties.

TECHNICAL FIELD

This disclosure relates to the field of communication technologies, and in particular, to a photographing device and a communication device.

BACKGROUND

Cameras are widely used in daily lives, such as a safe city, traffic, campus monitoring, and another field, and are developed rapidly in recent years.

A function of the camera has evolved from an original closed-circuit television (CCTV) to an intelligent camera. After evolution, the camera performs real-time analysis on a picture, such as facial recognition and license plate recognition, instead of originally simply recording a picture, and a high-power artificial intelligence (AI) chip needs to be integrated into the camera. A picture quality requirement of the camera is also increasingly high. Currently, resolution is mainly 1080 progressive scan (1080P), and a capability of a video processing chip increases exponentially. This causes the flowing problems. Heat consumption of the camera is greatly increased, and it is difficult for a conventional camera from which heat is naturally dissipated to meet a requirement.

Functions of the camera become increasingly more complex, customization becomes increasingly more, and particularly, wireless connection requirements become increasingly more, such as a sensing module (a radar) and a communication module (WI-FI, fifth generation (5G), microwave, ZIGBEE, 433, BLUETOOTH, and the like). However, to dissipate heat, the camera mostly uses an aluminum housing, and consequently a signal is shielded when the wireless module is installed inside. As a result, the wireless module only can be hung outside. As modules increase, it is difficult to hang the modules outside.

Different functional modules of the camera are combined in configuration in many manners based on an actual application scenario. However, due to a limitation of a high airtight waterproof requirement of an outdoor camera, the functional module cannot be selected and configured on a project site, and usually needs to be installed before delivery based on specific configuration, which causes insufficient functions or redundant functions.

SUMMARY

This disclosure provides a photographing device and a communication device, to facilitate heat dissipation of the photographing device.

According to a first aspect, a photographing device is provided. The photographing device is applied to a communication device, and the photographing device includes a housing. The housing serves as a carrying part and is configured to carry an electronic component of the photographing device, such as a lens module and an expansion module. To facilitate disposing of the foregoing electronic component, when the housing is disposed, a lens cavity and an expansion cavity isolated from each other are disposed in the housing. The lens module is disposed in the lens cavity, and the expansion cavity is configured to accommodate the expansion module. When the expansion module is accommodated, a heat dissipation apparatus is disposed in the expansion cavity, and the expansion module is disposed on the heat dissipation apparatus and is thermally connected to the heat dissipation apparatus. In addition, a heat dissipation channel isolated from the expansion cavity is disposed in the heat dissipation apparatus. Therefore, an effect of dissipating heat from the expansion module and the lens module may be improved through air flowing in the heat dissipation channel. The heat dissipation channel includes an air inlet and an air outlet, the heat dissipation channel is in a U shape, and the air inlet and the air outlet are located at two ends of the U shape. It can be learned from the foregoing description that in the photographing device provided in embodiments of this disclosure, a structure of the photographing device is divided into different functional modules, and both the lens module and the expansion module can be assembled in the housing by using the disposed heat dissipation apparatus, thereby improving security and a heat dissipation effect of the electronic component. In addition, the U-shaped heat dissipation channel is used in this disclosure, and the air inlet and the air outlet are located at the two ends of the U shape. In this way, a better waterproof effect can be obtained. When the device is installed outdoors, the air inlet and the air outlet may face downwards. In this way, rainwater usually flows downwards under a function of gravity, and rarely enters the device through the air inlet, thereby ensuring waterproof performance of the device.

In a specific implementable solution, the housing includes a support housing and a second housing and a first housing that are connected to the support housing through sealing, where the second housing and the support housing form the expansion cavity, and the first housing and the support housing form the lens cavity. The housing uses a separated structure, so that when the lens module or the expansion module is assembled, the second housing or the first housing may be separately opened, to facilitate assembly of the photographing device.

In a specific implementable solution, the support housing has two opposite sides, the air inlet and the air outlet are disposed on one side of the support housing, and the second housing is connected to the support housing on the other side of the support housing.

In a specific implementable solution, the heat dissipation apparatus further includes a fan, and the fan is configured to allow air to flow along the heat dissipation channel. Further, the fan may be disposed at the air inlet, the air outlet, or a specific internal location. Air fluidity in the heat dissipation channel is improved by using the fan, thereby improving a heat dissipation effect.

In a specific implementable solution, the heat dissipation apparatus includes a heat dissipation housing and a plurality of heat dissipation fins disposed in the heat dissipation housing. The plurality of heat dissipation fins is arranged at intervals, and divide space in the heat dissipation housing into heat dissipation channels. The heat dissipation fins are disposed to enlarge an area in contact with air, thereby improving a heat dissipation effect.

In a specific implementable solution, the heat dissipation channel is a linear heat dissipation channel, and the air inlet and the air outlet are respectively disposed at two opposite ends of the heat dissipation housing. The linear heat dissipation channel is used, so that the heat dissipation channel can generate an air drawing effect like a chimney, thereby improving a heat dissipation effect.

In a specific implementable solution, the heat dissipation channel is a U-shaped heat dissipation channel, and the air inlet and the air outlet are located on a same side of the heat dissipation housing. This increases a distance by which air flows in the heat dissipation channel, thereby improving a heat dissipation effect.

In a specific implementable solution, when the photographing device is normally installed, the two ends of the U-shaped heat dissipation channel face downwards. In this way, when the photographing device is installed outdoors, rainwater less easily enters the photographing device, thereby improving waterproof performance.

In a specific implementable solution, a first partition board is disposed in the heat dissipation housing, and the first partition board isolates the air inlet from the air outlet. The air inlet is isolated from the air outlet by using the first partition board, to avoid air mixing.

In a specific implementable solution, the heat dissipation fins are vertically disposed on two opposite surfaces of the first partition board, to improve a heat dissipation effect.

In a specific implementable solution, the heat dissipation apparatus is in an integrated structure with the support housing, or is fixedly connected to the support housing. The support housing and the heat dissipation apparatus are used together to dissipate heat.

In a specific implementable solution, a mounting bracket is disposed on the support housing, and the mounting bracket is configured to connect to a support device, to facilitate fastening of the photographing device.

In a specific implementable solution, a hollow cavity is disposed in the support housing, and the cavity communicates with the heat dissipation channel. In addition, an air vent communicating with the cavity is disposed on the support housing, to improve a heat dissipation effect.

In a specific implementable solution, a ventilation cover covering the air vent is further included, and the ventilation cover is detachably and fixedly connected to the support housing. The ventilation cover is used to prevent impurities from entering the heat dissipation apparatus.

In a specific implementable solution, when the air inlet and the air outlet are located on a same side of the heat dissipation housing, a second partition board is disposed in the cavity, and the air inlet and the air outlet are respectively arranged on two sides of the second partition board. The second partition board is used to avoid air mixing in the cavity, thereby improving a heat dissipation effect.

According to a second aspect, a communication device is provided. The communication device includes a support part and any of the foregoing photographing devices connected to the support part. In the photographing device provided in embodiments of this disclosure, a structure of the photographing device is divided into different functional modules, and both the lens module and the expansion module can be assembled in the housing by using the disposed heat dissipation apparatus, thereby improving security and a heat dissipation effect of the electronic component. In addition, the U-shaped heat dissipation channel is used in this disclosure, and the air inlet and the air outlet are located at the two ends of the U shape. In this way, a better waterproof effect can be obtained. When the device is installed outdoors, the air inlet and the air outlet may face downwards. In this way, rainwater usually flows downwards under a function of gravity, and rarely enters the device through the air inlet, thereby ensuring waterproof performance of the device.

DESCRIPTION OF EMBODIMENTS

Figure 1:
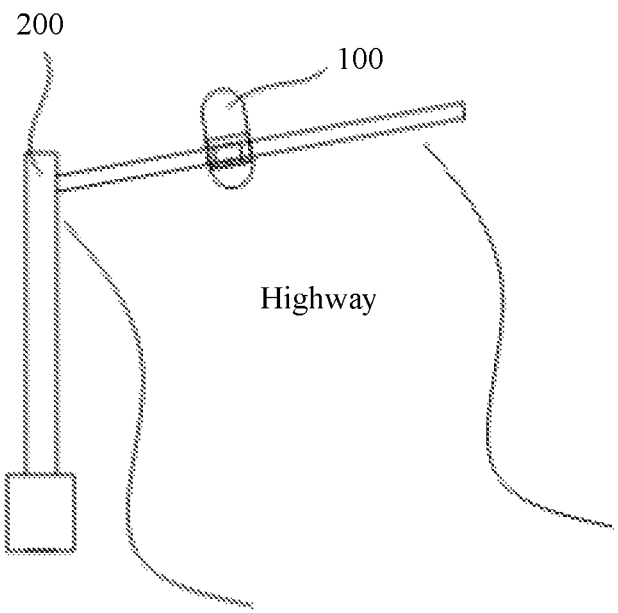
FIG. 1 is a schematic diagram of a structure of a communication device according to an embodiment of this disclosure.

To facilitate understanding of a photographing device provided in embodiments of this disclosure, an application scenario of the photographing device provided in embodiments of this disclosure is first described. The photographing device provided in embodiments of this disclosure may be a camera or another device that has a photographing function, and may be applied to monitoring in various scenarios such as a home, an enterprise, and a city (such as traffic monitoring and public security monitoring). Using the traffic field as an example, FIG. 1 is a schematic diagram when a camera is applied to the traffic field. In FIG. 1, the photographing device is fastened above a street by using a support pole 200, and the photographing device 100 may photograph a pedestrian and a vehicle on the street. In addition, a picture photographed by the photographing device 100 needs to be transmitted to a traffic command center or another monitoring center through communication. In addition, as functions of the photographing device 100 continuously increase, customization becomes increasingly more, and particularly, wireless connection requirements become increasingly more, for example, different modules such as a sensing module (a radar) and a communication module (WI-FI, 5G, microwave, ZIGBEE, 433, BLUETOOTH, and the like), so that different modules need to be added inside the photographing device 100. However, to dissipate heat, an existing photographing device 100 mostly uses an aluminum housing, and consequently a signal is shielded when the modules are installed inside the photographing device 100. As a result, the modules only can be hung outside. However, as modules increase, it is difficult to hang the modules outside. Therefore, embodiments of this disclosure provide a photographing device 100, and the photographing device 100 is described below in detail with reference to the accompanying drawings and specific embodiments.

Figure 2:
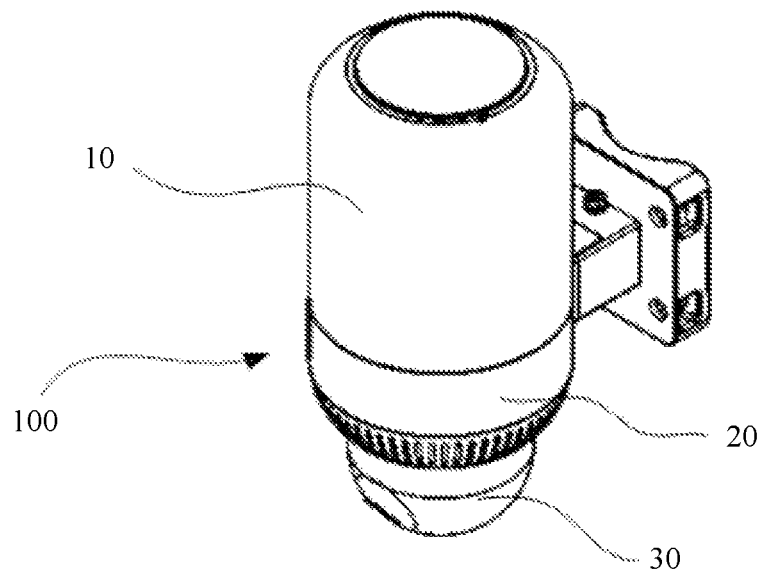
FIG. 2 is a schematic diagram of a structure of a camera according to an embodiment of this disclosure.
Figure 3:
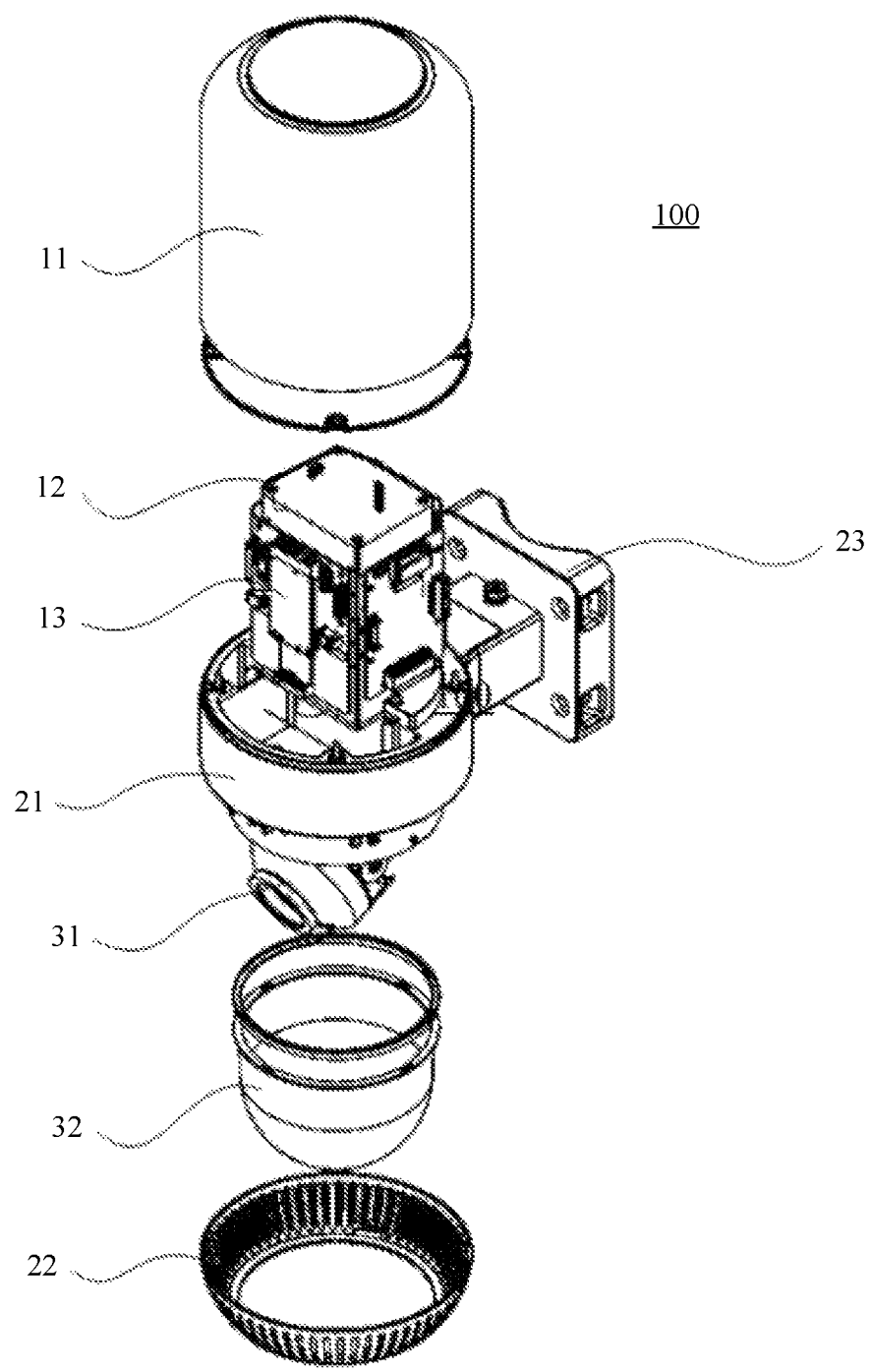
FIG. 3 is a schematic exploded diagram of a camera according to an embodiment of this disclosure.

First, refer to FIG. 2 and FIG. 3. FIG. 2 is a schematic diagram of a structure of a photographing device 100 according to an embodiment of this disclosure, and FIG. 3 is schematic exploded diagram of a photographing device 100 according to an embodiment of this disclosure. It can be learned from FIG. 2 that the photographing device 100 provided in embodiments of this disclosure mainly includes three parts: an expansion module 10, a main module 20, and a photographing module 30. Using a placement direction of the photographing device 100 shown in FIG. 2 as a reference direction, the expansion module 10 and the photographing module 30 are respectively arranged on two sides of the main module 20, and the expansion module 10 and the photographing module 30 are separately connected to the main module 20. The photographing module 30 is a part that is in the photographing device 100 and that is configured to photograph an image. The expansion module 10 is a module including a communication module and a sensing module. The main module 20 serves as a support structure of the entire photographing device 100, and is configured to connect the photographing module 30 and the expansion module 10.

Still refer to FIG. 2 and FIG. 3. The main module 20 provided in embodiments of this disclosure is first described. Serving as a support structure, the main module 20 includes a support housing 21. As shown in FIG. 3, the support housing 21 is a cylindrical housing, and the cylindrical housing has two opposite end faces. For ease of description, the two end faces are respectively named as a first end face and a second end face, where the first end face is used to connect to the photographing module 30, and the second end face is used to connect to the expansion module 10. When the support housing 21 is disposed, the support housing 21 uses a housing of a metal material, for example, a housing manufactured by using metal materials such as aluminum, iron, steel, aluminum alloy, and stainless steel, so that the support housing 21 has specific support strength, and can stably support the photographing module 30 and the expansion module 10. Still refer to FIG. 2. A side wall of the support housing 21 is further connected to a mounting bracket 23. As shown in FIG. 2, the mounting bracket 23 may be fixedly connected to the side wall of the support housing 21 by using a support arm, and certainly may be fixedly connected to the support housing 21 by using another structure. When the photographing device 100 is assembled, the photographing device 100 may be fastened to support parts such as a wall and a mounting pole by using the mounting bracket 23. As shown in FIG. 1, when the photographing device 100 is fastened to the support pole 200, the photographing device 100 is fixedly connected to the support pole 200 by using the mounting bracket 23, to fasten the photographing device 100 to the support pole 200.

When the mounting bracket 23 is disposed, the mounting bracket 23 and the support housing 21 may be in an integrated structure, or may be fixedly connected together by using a threaded connector (such as a bolt or a screw) or through welding. In addition, a specific structure of the mounting bracket 23 may also be in different structure forms, for example, a common fastening structure such as a hoop or a fastening bracket. This is not limited herein. Moreover, the mounting bracket 23 is also manufactured by using a metal material with specific rigidity, so that stability of the photographing device 100 can be ensured after the photographing device 100 is fastened to the support pole 200. A material of the mounting bracket 23 may be the same as a material of the support housing 21, and details are not described herein again.

When the support housing 21 uses a housing manufactured by using the foregoing metal material, the support housing 21 has good thermal conductive performance. Therefore, in addition to serving as a structure for supporting the photographing module 30 and the expansion module 10, the main module 20 may further serve as a heat dissipation structure for the photographing module 30 and the expansion module 10. The main module 20 is described below in detail with reference to specific structures of the photographing module 30 and the expansion module 10.

The photographing module 30 is first described. Refer to the photographing device 100 shown in FIG. 2 and FIG. 3. In the photographing device 100 shown in FIG. 2, the photographing module 30 is located below the main module 20 (the placement direction of the photographing device 100 shown in FIG. 2 is used as the reference direction), and is fixedly connected to the first end face of the support housing 21 of the main module 20. Refer to FIG. 3. The photographing module 30 provided in embodiments of this disclosure includes a lens module 31 and a first housing 32 configured to protect the lens module 31. The lens module 31 is fastened to the first end face of the support housing 21, and the first housing 32 covers the lens module 31 and is detachably and fixedly connected to the support housing 21. When the lens module 31 is fastened to the first end face of the support housing 21, the lens module 31 is detachably and fixedly connected to the first end face. For example, the lens module 31 and the support housing 21 are detachably and fixedly connected by using a part such as a bolt or a screw, and certainly may be detachably and fixedly connected by using a buckle or in another manner. In addition, when the lens module 31 is fastened to the first end face, a chip in the lens module 31 is thermally connected to the first end face. For example, the chip in the lens module 31 is directly attached to the first end face, or the chip in the lens module 31 is thermally connected to the first end face by using a thermally conductive adhesive. Because the support housing 21 has good thermal conductivity, heat generated when the chip in the lens module 31 is used may be transferred to the support housing 21 by using the first end face, and is transferred to the outside by using the support housing 21. In addition, when the mounting bracket 23 is also manufactured by using a material with good thermal conductivity, the mounting bracket 23 may also serve as a heat dissipation component of the lens module 31, and heat transferred to the support housing 21 is transferred to the mounting bracket 23 again for heat dissipation.

Figure 4:
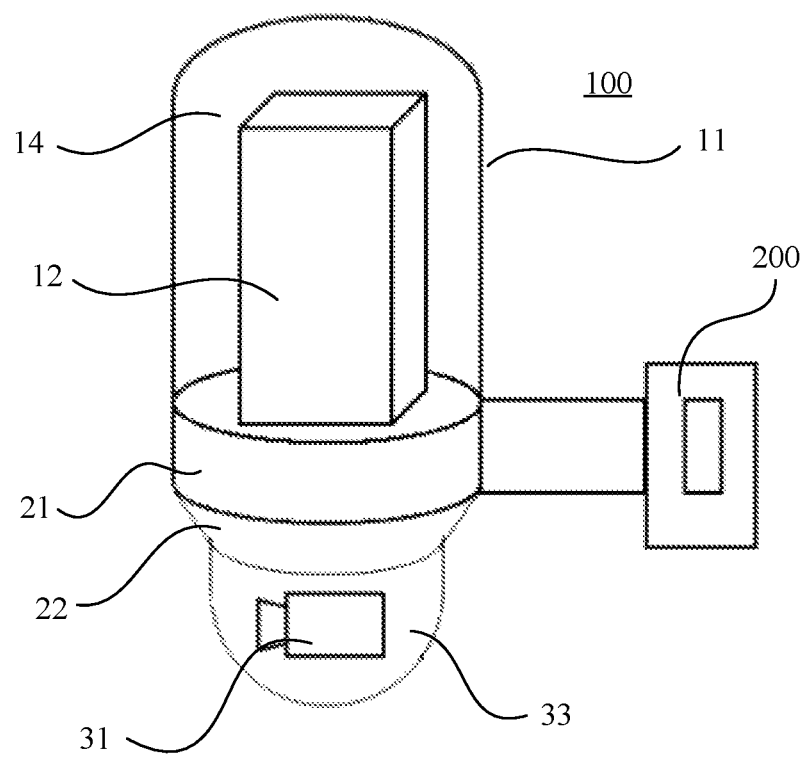
FIG. 4 is a schematic diagram of a structure of a camera according to an embodiment of this disclosure.

Still refer to FIG. 3. It can be learned from FIG. 3 that the first housing 32 is a hemispherical housing, and a shape of the first housing 32 matches the lens module 31. When the first housing 32 is fixedly connected to the support housing 21, the first housing 32 may be connected to the support housing 21 by using a thread, for example, an inner thread and an outer thread are respectively disposed on the first housing 32 and the support housing 21. During connection, the first housing 32 is fixedly connected to the support housing 21 through cooperation between the inner thread and the outer thread. Certainly, the first housing 32 may be connected to the support housing 21 by using a threaded connector (a bolt or a screw). FIG. 4 is a schematic diagram of a model of the photographing module 30. When the first housing 32 is fixedly connected to the support housing 21, the first housing 32 and the support housing 21 form a cavity. For ease of description, the cavity is named as a lens cavity 33, and the lens module 31 of the photographing module 30 is located in the lens cavity 33. When the first housing 32 is further disposed, the first housing 32 is manufactured by using a transparent material, such as plastic, reinforced glass or glass, or another material. Certainly, the first housing 32 may be manufactured by using a non-transparent material.

However, at least an area that is on the first housing 32 and that corresponds to an angle of view range of a lens of the lens module 31 is transparent, to ensure that external light can be irradiated on the lens of the lens module 31 to form an image. In addition, because the lens module 31 has a relatively high requirement on an environment, the lens cavity 33 is manufactured as an airtight cavity, for example, a sealing rubber ring is installed in a cooperation gap between the first housing 32 and the support housing 21, to achieve airtight protection, prevent fog from being formed because vapor enters when the lens component is used in the lens cavity 33, and prevent external impurities from falling on the lens of the lens module 31, thereby improving a photographing effect of the lens module 31.

Still refer to FIG. 2, FIG. 3, and FIG. 4. The photographing device 100 provided in embodiments of this disclosure further includes the expansion module 10, and the expansion module 10 includes a second housing 11, an expansion module 13, and a heat dissipation apparatus 12. As shown in FIG. 4, the second housing 11 and the support housing 21 are connected and form an expansion cavity 14. The expansion cavity 14 is configured to accommodate the expansion module 13. When the second housing 11 is further disposed, the second housing 11 uses a cylindrical housing that matches the support housing 21. The expansion cavity 14 needs to accommodate the expansion module 13, to prevent the second housing 11 from shielding a signal of the expansion module 13. Therefore, the second housing 11 is an unshielded housing that allows a signal to penetrate, for example, an unshielded housing manufactured by using a material, such as plastic or resin, that does not cause shielding. It can be learned from FIG. 3 that when the second housing 11 is connected to the support housing 21, the second housing 11 is detachably connected to the support housing 21, so that the expansion module 13 is placed in the expansion cavity 14. For example, the second housing 11 is connected to the support housing 21 by using a thread, or the second housing 11 is connected to the support housing 21 by using a threaded connector (a bolt or a screw) or a buckle. It can be learned from FIG. 1 that it may be rainy weather when the photographing device 100 is used. To ensure security of the expansion module 13, waterproofing processing is performed when the second housing 11 is connected to the support housing 21, for example, waterproofing between the second housing 11 and the support housing 21 is implemented by using a sealing pad or sealing glue, to ensure security of the expansion module 13.

Different expansion modules 13 may be selected as the foregoing expansion module 13, for example, different modules such as a sensing module (a radar) and a communication module (WI-FI, 5G, microwave, ZIGBEE, 433, BLUETOOTH, and the like).

Figure 5:
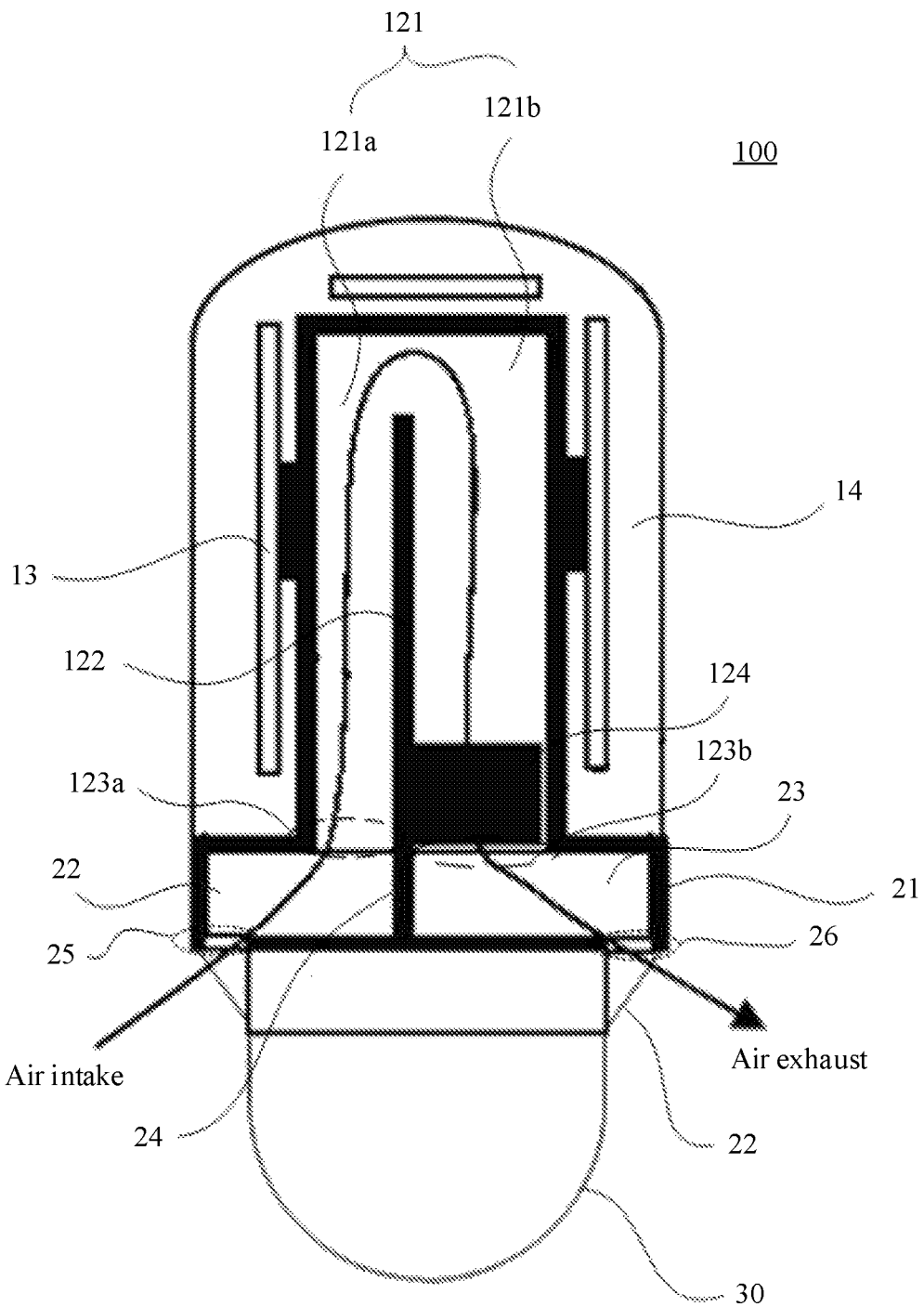
FIG. 5 is a schematic diagram of an internal structure of a camera according to an embodiment of this disclosure.

Still refer to FIG. 3 and FIG. 4. The heat dissipation apparatus 12 is disposed in the expansion cavity 14, and the heat dissipation apparatus 12 is configured to support the expansion module 13. FIG. 5 is a diagram of an internal structure of the photographing device 100. The heat dissipation apparatus 12 provided in embodiments of this disclosure includes a heat dissipation housing 125 and a fan 124. The heat dissipation housing 125 is a rectangular heat dissipation housing 125, and the heat dissipation housing 125 has a plurality of walls, for example, structures such as a top wall and a side wall at different locations. Each wall is provided with a mounting hole. When the expansion module 13 is fastened to the heat dissipation housing 125, the expansion module 13 may be fastened to a wall of the heat dissipation housing 125 by using a threaded connector (a bolt or a screw). Certainly, in addition to the foregoing manner, a slot may be disposed on the wall of the heat dissipation housing 125, a corresponding buckle is disposed on the expansion module 13, and the expansion module 13 is fastened to the heat dissipation housing 125 through the slot and the buckle. The foregoing is described by using an example in which the expansion module 13 can be fastened to each wall. In embodiments of this disclosure, only some walls may be used to fasten the expansion module 13. For example, only the side wall is used to support the expansion module 13, or the expansion module 13 is disposed on only the top wall. Certainly, different manners may be used, for example, a part of the side wall and a part of a top part are used to support the expansion module 13.

Still refer to FIG. 5. The heat dissipation housing 125 is a hollow housing, and has a heat dissipation channel 121 inside. The heat dissipation channel 121 is configured to dissipate heat from the expansion module 13 fastened to the heat dissipation housing 125, that is, air can pass through the heat dissipation channel, to dissipate heat from a component that generates heat inside the photographing device. The heat dissipation channel includes an air inlet and an air outlet, the heat dissipation channel is in a U shape, and the air inlet and the air outlet are located at two ends of the U shape. For example, refer to FIG. 5 and FIG. 8. The heat dissipation channel is in the U shape. The U shape herein means that the heat dissipation channel has two openings: the air inlet and the air outlet. After entering from the air inlet, air passes a bend and is then exhausted from the air outlet, thereby forming a rough "U" shape. However, the heat dissipation channel is not limited to be in a strict U shape. In addition, the air inlet and the air outlet are disposed on a side of the "U"-shaped structure, and when the photographing device is normally installed, the two ends of the U-shaped heat dissipation channel face downwards. For example, as shown in FIG. 5, the support housing has two opposite sides, and the air inlet and the air outlet are disposed on one side of the support housing (both the air inlet 25 and the air outlet 26 are disposed at a lower part of the U-shaped structure (an inverted U shape) shown in the figure). The second housing is connected to the support housing on the other side of the support housing. In addition, it can be understood that to ensure that air flows through the heat dissipation channel, each corresponding component in the photographing apparatus needs to have a corresponding hole or cavity structure and various isolation structures (that is, a structure used to prevent air from passing, such as a partition board) to form a heat dissipation channel. For example, as shown in FIG. 5, a hole 25 is provided on a left part of the support housing 21 shown in the figure, to form the air inlet of the heat dissipation channel. In addition, a hole 123a is further provided to allow air to further enter the photographing device. Similarly, a hole 26 and a hole 123b are provided on a right part of the support housing 21 to allow air to leave, and some partition boards (such as 122 and 24) are used for cooperation to form the heat dissipation channel. The photographing device shown in FIG. 5 is described below.

As shown in FIG. 5, when the heat dissipation channel 121 is disposed, one end of the heat dissipation housing 125 is opened and the other end is closed, and a first partition board 122 is disposed in the heat dissipation housing 125. The first partition board 122 splits space in the heat dissipation housing 125 into two parts in communication, which are respectively a first air intake cavity 121a and a first air exhaust cavity 121b. As shown in FIG. 5, when the first partition board 122 is disposed, one end of the first partition board 122 is flush with the opened end of the heat dissipation housing 125, and the other end of the first partition board 122 and the top wall of the heat dissipation housing 125 are spaced by a specific gap, so that the parts obtained by splitting the heat dissipation channel 121 by the first partition board 122 communicate with each other. Still refer to FIG. 5. The heat dissipation channel 121 has an air inlet and an air outlet. For ease of description, the air inlet is named as a first air inlet 123a, and the air outlet is named as a second air outlet 26. It can be learned from FIG. 5 that the first air inlet 123a communicates with the first air intake cavity 121a, the first air outlet 123b communicates with the first air exhaust cavity 121b, and the first air inlet 123a and the first air outlet 123b are located on the opened side of the heat dissipation housing 125, and are separated by using the first partition board 122 to avoid air mixing.

Still refer to FIG. 5. When the heat dissipation apparatus 12 is disposed in the expansion cavity 14, the opened side of the heat dissipation housing 125 faces the support housing 21, and the heat dissipation housing 125 and the support housing 21 are in an integrated structure. Certainly, the heat dissipation housing 125 and the support housing 21 each may be in a separated structure. In this case, the heat dissipation housing 125 is fixedly connected to the support housing 21 by using a threaded connector (a bolt or a screw) or a buckle, or is fixedly connected to the support housing 21 through wielding or bonding. Still refer to FIG. 5. The support housing 21 may also be hollow, and a second partition board 24 is disposed in the support housing. The second partition board 24 divides a cavity in the support housing 21 into two parts, which are respectively a second air intake cavity 22 and a second air exhaust cavity 23. The second air intake cavity 22 has two opposite openings. One opening is provided on a first end face, and the opening communicates with the first air inlet 123a of the first air intake cavity 121a. The other opening is provided on a side wall of the support housing 21, and serves as an air inlet, which is named as a second air inlet 25 for ease of distinguishing. The second air exhaust cavity 23 also has two opposite openings. One opening is provided on the first end face, and the opening communicates with the first air outlet 123b of the first air exhaust cavity 121b. The other opening is provided on the side wall of the support housing 21, and serves as an air outlet, which is named as a second air outlet 26 for ease of distinguishing. When air flows, as shown by an arrow in FIG. 5, the air enters the second air intake cavity 22 from the second air inlet 25, and then flows into the first air intake cavity 121a. Then the air flows into the first air exhaust cavity 121b and the second air exhaust cavity 23, and flows out through the second air outlet 26.

It can be learned from the foregoing description that the second air inlet 25 and the second air outlet 26 communicate with the heat dissipation channel 121 as air vents, and external air enters the heat dissipation channel 121 through the air vent. To prevent external impurities from entering the heat dissipation channel 121 to block the heat dissipation channel 121, the main module 20 provided in embodiments of this disclosure further includes a ventilation cover 22, and the ventilation cover 22 is detachably and fixedly connected to the support housing 21. Refer to FIG. 3 and FIG. 5. The ventilation cover 22 is in a circular housing structure, a side wall of the ventilation cover 22 is an arc-shaped face, and a plurality of through-holes arranged in a single row are provided on the side wall. During assembly, the ventilation cover 22 passes through the first housing 32 and is then connected to the support housing 21 by using a thread. Certainly, the ventilation cover 22 may be connected to the support housing 21 by using a buckle or a threaded connector (a bolt or a screw). When the ventilation cover 22 is fastened to the support housing 21, the ventilation cover 22 covers the second air inlet 25 and the second air outlet 26, and the through-holes on the ventilation cover 22 separately communicate with the second air inlet 25 and the second air outlet 26. It can be learned from FIG. 5 that external air passes through the ventilation cover 22 before entering the heat dissipation channel 121. Therefore, the ventilation cover 22 is disposed at the air vent, to prevent a foreign object from being inhaled into the photographing device 100, thereby improving heat dissipation reliability and playing a decoration role.

Still refer to FIG. 5. When the first partition board 122 and the second partition board 24 are disposed, the first partition board 122 and the second partition board 24 may be fixedly connected, for example, may be connected in different manners such as welding and bonding. Certainly, the first partition board 122 and the second partition board 24 may be in an integrated structure. In this case, the first partition board 122 and the second partition board 24 are integrally manufactured, and split a cavity between the heat dissipation housing 125 and the support housing 21 into two parts. When the first partition board 122 and the second partition board 24 are disposed, the first partition board 122 and the second partition board 24 are also manufactured by using materials with good thermal conductivity, such as copper and aluminum. When the first partition board 122 and the second partition board 24 are connected to the support housing 21, the first partition board 122 and the second partition board 24 are thermally connected to the support housing 21, and the support housing 21 is also thermally connected to the heat dissipation housing 125. Therefore, heat generated when the expansion module 13 and the lens module 31 work may be transferred to the support housing 21, the heat dissipation housing 125, the first partition board 122, and the second partition board 24. When air flows, the air is separately in contact with the support housing 21, the heat dissipation housing 125, the first partition board 122, and the second partition board 24, to take away heat transferred by the expansion module 13 and the lens module 31 to the support housing 21, the heat dissipation housing 125, the first partition board 122, and the second partition board 24.

Figure 6:
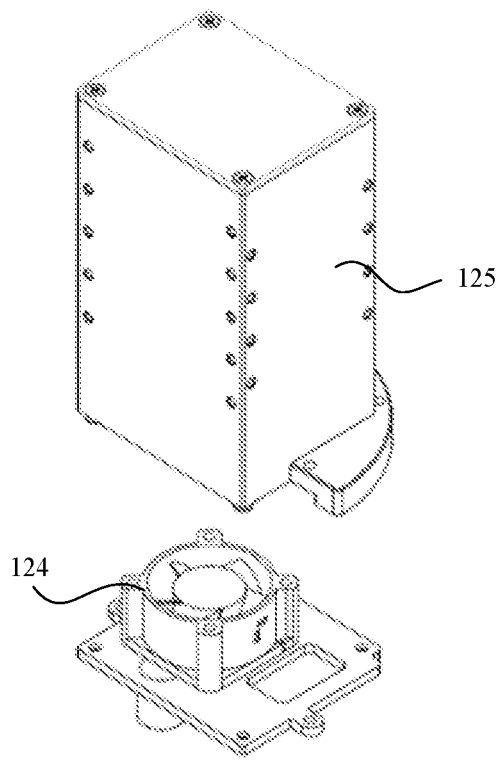
FIG. 6 is a schematic exploded diagram of a heat dissipation apparatus according to an embodiment of this disclosure.
Figure 7:
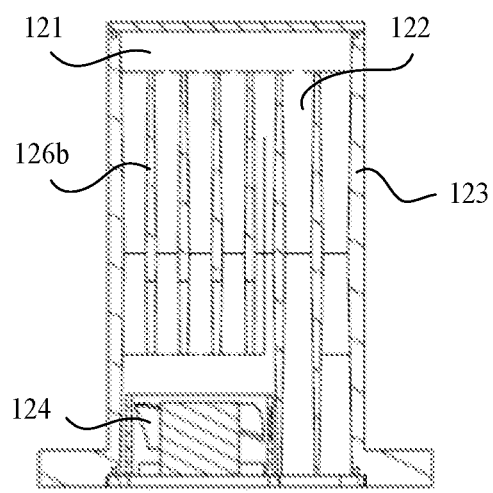
FIG. 7 is a cutaway view of a heat dissipation apparatus according to an embodiment of this disclosure.
Figure 8:
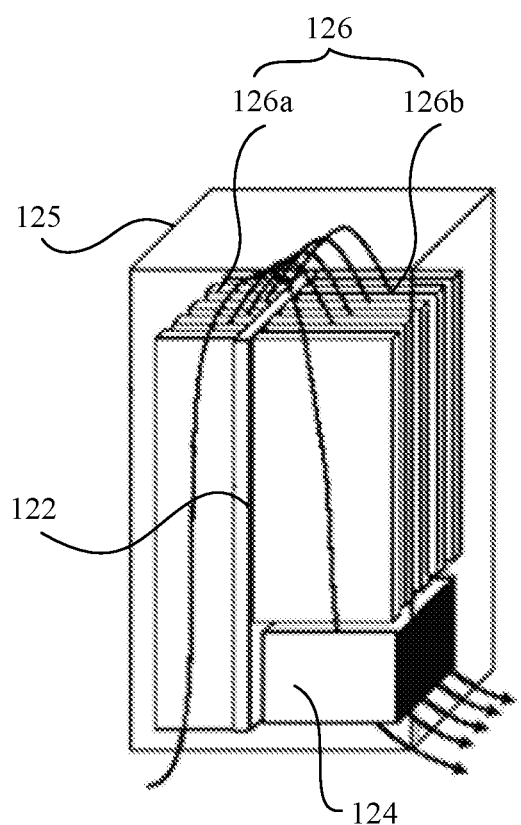
FIG. 8 is a block diagram of a structure of a heat dissipation apparatus according to an embodiment of this disclosure.

Refer to FIG. 6 and FIG. 7. FIG. 6 is a schematic exploded diagram of the heat dissipation apparatus 12, and FIG. 7 is a cutaway view at A-A in FIG. 6. As shown in FIG. 7, a plurality of heat dissipation fins 126 are further disposed in the heat dissipation housing 125, and the plurality of heat dissipation fins 126 are arranged at intervals. When heat is dissipated, air flows through the heat dissipation fins 126, to take away heat on the heat dissipation fins 126. Further, the heat dissipation fins 126 may be arranged in parallel with specific gaps left in the middle, so that air can flow through the gaps. Refer to FIG. 7 and FIG. 8. FIG. 8 illustrates a block diagram of an internal structure of the heat dissipation apparatus 12. When the plurality of heat dissipation fins 126 are disposed, the plurality of heat dissipation fins 126 are separately arranged on two opposite sides of the first partition board 122. For ease of description, two opposing surfaces of the first partition board 122 are defined, where a first surface is a surface that is of the first partition board 122 and that faces the first air intake cavity 121a, and a second surface is a surface that is of the first partition board 122 and that faces the first air exhaust cavity 121b. The plurality of heat dissipation fins 126 are separately disposed on the first surface and the second surface, and are thermally connected to the first partition board 122. For ease of description, the heat dissipation fin 126 disposed on the first surface is named as a first heat dissipation fin, and the heat dissipation fin 126 located on the second surface is named as a second heat dissipation fin 126b. As shown in FIG. 7 and FIG. 8, a specific shape of the first heat dissipation fin 126a is shown in FIG. 7. A length direction of the first heat dissipation fin 126a is disposed along an air flowing direction, and when the first heat dissipation fin 126a is fastened to the first partition board 122, each first heat dissipation fin 126a is perpendicular to the first surface and thermally connected to the first partition board 122. Heat generated by the expansion module 13 and the lens module 31 may be transferred to the first heat dissipation fin 126a by using the first partition board 122. When air flows, the air flows through the first heat dissipation fin 126a and the first partition board 122, to enlarge an area in contact with the air, thereby improving a heat dissipation effect. A disposing manner of the second heat dissipation fin 126b is the same as the deposing manner of the first heat dissipation fin 126a, and details are not described herein again.

Still refer to FIG. 7 and FIG. 8. The fan 124 is further disposed in the heat dissipation apparatus 12 provided in embodiments of this disclosure. The fan 124 is configured to improve an air flowing speed in the heat dissipation channel 121. When the fan 124 is disposed, the fan 124 is detachably connected to the heat dissipation housing 125, and when the fan 124 is fixedly connected to the heat dissipation housing 125, the fan 124 is located in the first air exhaust cavity 121b. As shown in FIG. 7, a length of the second heat dissipation fin 126b in the first air exhaust cavity 121b is less than a length of another second heat dissipation fin 126b, so that installation space of the fan 124 is left in the second air exhaust cavity 23. An air intake side of the fan 124 faces the first air exhaust cavity 121b, and an air exhaust side of the fan 124 faces the second air exhaust cavity 23. During use, rotation of the fan 124 may increase a rate at which air flows in the heat dissipation channel 121, thereby improving a heat dissipation effect of the heat dissipation apparatus 12.

It can be learned from the foregoing description that when the heat dissipation apparatus 12 is disposed, the heat dissipation housing 125 is located in the second housing 11 and has a gap with the second housing 11. In addition, the heat dissipation housing 125 communicates with the support housing 21, and the heat dissipation channel 121 is ventilated by using the air vent disposed on the support housing 21, and air does not enter the expansion cavity 14. Therefore, when waterproof processing is performed on the expansion module 13, it is only required to ensure sealing property when the second housing 11 is connected to the support housing 21. In addition, when the foregoing manner is used, the heat dissipation channel 121 is a U-shaped bent channel, so that air can have a relatively long flowing length in the heat dissipation channel 121, thereby enhancing a heat exchange effect and improving a heat dissipation effect.

It should be understood that in the example shown in FIG. 5, heat dissipation of the lens module 31 and that of the expansion module 13 are combined together. However, there is not only the heat dissipation manner in FIG. 5 in embodiments of this disclosure, and heat may be separately dissipated from the lens module 31 and the expansion module 13. For example, heat is dissipated from the expansion module 13 by using the heat dissipation apparatus 12, and heat is dissipated from the lens module 31 by using the support housing 21. The heat is separately dissipated from the two modules, and there is no heat transfer. A specific structure is similar to the foregoing structure, and details are not described herein again.

Figure 9:
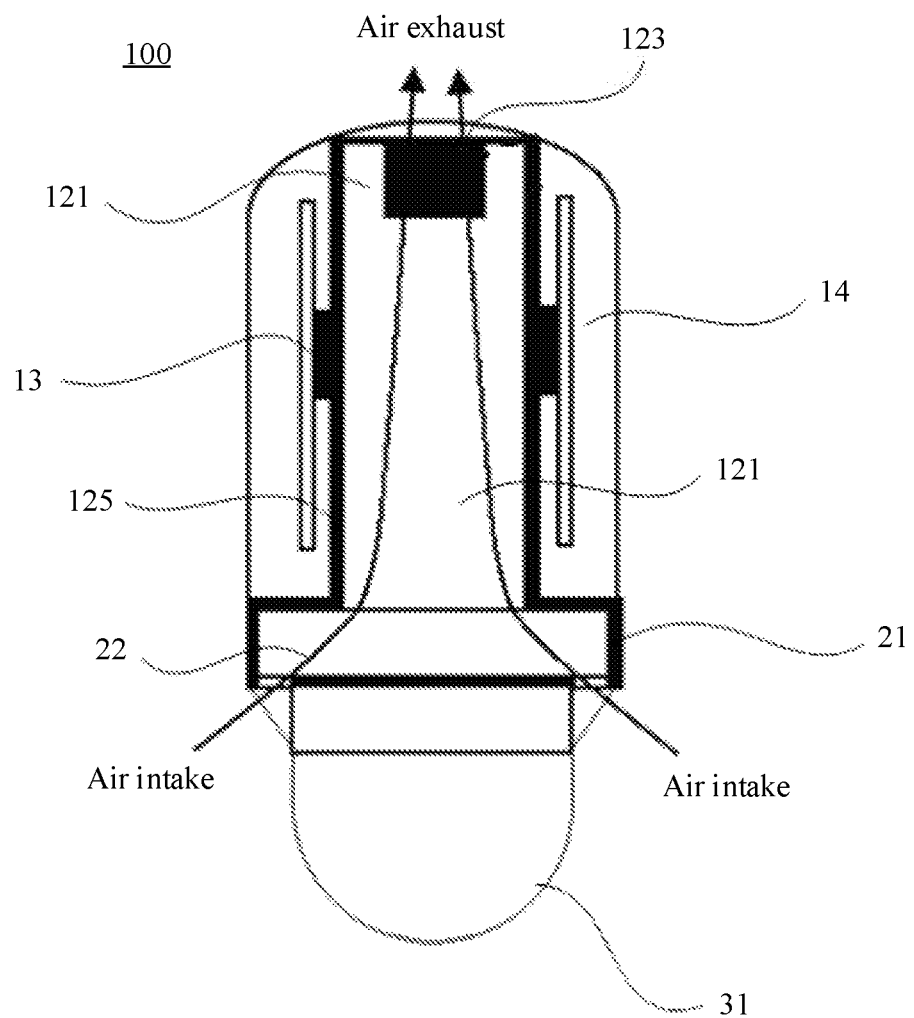
FIG. 9 is a schematic diagram of an internal structure of another camera according to an embodiment of this disclosure.

FIG. 9 shows another photographing device 100 according to an embodiment of this disclosure. For a reference numeral in FIG. 9, refer to the reference numeral in FIG. 5. The photographing device 100 shown in FIG. 9 and the photographing device 100 shown in FIG. 5 differ in only the heat dissipation apparatus 12. As shown in FIG. 9, the heat dissipation channel 121 provided in embodiments of this disclosure is a linear heat dissipation channel 121. During specific disposing, as shown in FIG. 9, the heat dissipation housing 125 is a square housing, and two ends of the heat dissipation housing 125 are opened. An opening at one end is an air inlet of the heat dissipation channel 121, and an opening at the other end is an air outlet of the heat dissipation channel 121. For ease of description, the air inlet is named as a first air inlet, and the air outlet is named as a first air outlet. When the heat dissipation housing 125 is disposed, the heat dissipation housing 125 is fixedly connected to the support housing 21. For example, the heat dissipation housing 125 is fixedly connected to the support housing 21 by using a threaded connector (a bolt or a screw) or a buckle, or is fixedly connected to the support housing 21 through wielding or bonding. Certainly, a manner may be used in which the heat dissipation housing 125 and the support housing 21 are in an integrated structure. Regardless of which manner is used, heat may be conducted between the heat dissipation housing 125 and the support housing 21. Still refer to FIG. 9. The support housing 21 is a hollow housing, and has an air intake cavity 22 inside. The air intake cavity also has two openings. One opening communicates with the heat dissipation channel 121, and the other opening is provided on a side wall of the support housing 21, and servers as an air inlet, which is named as a second air inlet 25 for ease of description.

Still refer to FIG. 9. When the heat dissipation housing 125 is disposed, the heat dissipation housing 125 penetrates through the expansion cavity 14, and the second housing 11 is provided with an opening that matches the heat dissipation housing 125. During assembly, the first air outlet of the heat dissipation housing 125 is exposed outside the opening. As shown by an air flowing direction show by an arrow in FIG. 9, air enters the air intake cavity from the second air inlet 25, then enters the heat dissipation channel 121, and is further exhausted from the first air outlet. It can be learned from FIG. 9 that when the linear heat dissipation channel 121 is used, the heat dissipation channel 121 may function as a "chimney". Air at the first air outlet has relatively high temperature, and therefore has relatively low air pressure and forms a low pressure area. However, air at the second air inlet is cold air, and has relatively high air pressure. When air flows, an air pressure difference between the second air inlet and the first air outlet increases fluidity of the air in the heat dissipation channel 121, thereby improving a heat dissipation effect.

Still refer to FIG. 9. When the foregoing disposing manner of the heat dissipation housing 125 is used, the first air outlet of the heat dissipation channel 121 needs to pass through the second housing 11. Therefore, to ensure a waterproof effect of the expansion module 13, waterproof processing for the heat dissipation housing 125 also needs to be ensured. Therefore, when the second housing 11 is connected to the support housing 21, the second housing 11 is also connected to the heat dissipation housing 125 through sealing by using a sealing pad, to ensure sealing property in the expansion cavity 14.

It can be learned from FIG. 5 and FIG. 9 that according to the photographing device 100 disclosed in embodiments of this disclosure, the photographing device 100 is divided into different modules, the lens module 31 and the expansion module 13 are separately disposed in different cavities, and replacement of the lens module 31 and that of the expansion module 13 are not mutually affected. In addition, the heat dissipation apparatus 12 is disposed in the expansion cavity 14, and the expansion module 13 is disposed on the heat dissipation apparatus 12 and is thermally connected to the heat dissipation apparatus 12. Heat is dissipated from the expansion module 13 by using the heat dissipation channel 121 isolated from the expansion cavity 14 in the heat dissipation apparatus 12. Therefore, an effect of dissipating heat from the expansion module 13 and the lens module 31 may be improved through air flowing in the heat dissipation channel 121. In addition, when the expansion module 13 needs to be selected and installed, each expansion module 13 is disposed in the expansion cavity 14, and only the second housing 11 needs to be opened. The lens cavity 33 does not need to be opened to disassemble the expansion module 13, thereby ensuring an airtightness requirement of the lens module 31, and resolving a problem that the expansion module 13 is selected and installed on site.

It should be understood that in the foregoing embodiment, the housing of the photographing device 100 is referred to as the support housing 21, the first housing, and the second housing 11 in Huawei. However, the housing of the photographing device 100 provided in embodiments of this disclosure is not limited to the foregoing manner, but may be in another manner. For example, the housing is divided into two housings, but the two housings are isolated from each other, and respectively form the lens cavity 33 and the expansion cavity 14. Alternatively, an integral housing may be used, and an opening and a blocking structure are disposed at each of two ends of the housing, to facilitate placement of the expansion module 13 and the lens module 31. Therefore, in embodiments of this disclosure, a structure form of the housing is not limited, provided that the lens cavity 33 and the expansion cavity 14 isolated from each other can be obtained through division in the housing.

An embodiment of this disclosure further provides a communication device. The communication device includes a support part and any of the foregoing photographing devices 100 connected to the support part. As shown in FIG. 1, the photographing device 100 is fastened above a street by using the support pole 200, and the photographing device 100 may photograph a pedestrian and a vehicle on the street. In addition, a picture photographed by the photographing device 100 needs to be transmitted to a traffic command center or another monitoring center through communication. In the photographing device 100 provided in embodiments of this disclosure, a structure of the photographing device 100 is divided into different functional modules, and both the lens module and the expansion module can be assembled in the housing by using the disposed heat dissipation apparatus, thereby improving security and a heat dissipation effect of the electronic component.

The foregoing are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A photographing device comprising:
    a housing comprising a support housing, wherein the support housing comprises a hollow cavity and an air vent opened to the hollow cavity;
    a lens cavity disposed in the housing;
    a lens system disposed in the lens cavity;
    an expansion cavity isolated from the lens cavity and disposed in the housing;
    a second housing coupled to the support housing through sealing, wherein the second housing and the support housing form the expansion cavity;
    a heat dissipation apparatus disposed within the expansion cavity and comprising a heat dissipation channel isolated from the expansion cavity, wherein the heat dissipation channel is exposed to the hollow cavity and is ventilated using the air vent, and wherein the heat dissipation channel is in a U shape and comprises:
        an air inlet located at a first end of the U shape; and
        an air outlet located at a second end of the U shape; and
    an expansion system that is disposed in the expansion cavity and that is fastened and thermally coupled to the heat dissipation apparatus.

2. The photographing device of claim 1, wherein the housing further comprises a first housing coupled to the support housing through sealing, wherein the first housing and the support housing form the lens cavity.

3. The photographing device of claim 1, wherein the support housing further comprises:
    a first side, wherein the air inlet and the air outlet are disposed on the first side; and
    a second side opposite to the first side, wherein the second housing is coupled to the support housing on the second side.

4. The photographing device of claim 1, further comprising a ventilation cover that covers the air vent and that is detachably and fixedly coupled to the support housing.

5. The photographing device of claim 1, wherein the hollow cavity comprises a partition board, and wherein the partition board comprises:
    a first side, wherein the air inlet is arranged on the first side; and
    a second side, wherein the air outlet is arranged on the second side.

6. The photographing device of claim 1, wherein the heat dissipation apparatus comprises a partition board configured to isolate the air inlet from the air outlet.

7. The photographing device of claim 1, wherein the first end and the second end are configured to face downwards when the photographing device is in use.

8. The photographing device of claim 1, wherein the heat dissipation apparatus comprises a fan configured to allow air to flow along the heat dissipation channel.

9. The photographing device of claim 1, wherein the heat dissipation apparatus comprises:
    a heat dissipation housing; and
    a plurality of heat dissipation fins disposed in the heat dissipation housing and arranged at intervals.

10. A communication device comprising:
    a support part; and
    a photographing device coupled to the support part and comprising:
        a housing comprising a support housing, wherein the support housing comprises a hollow cavity and an air vent opened to the hollow cavity;

a lens cavity disposed in the housing;
a lens system disposed in the lens cavity;
an expansion cavity isolated from the lens cavity and disposed in the housing;
a second housing coupled to the support housing through sealing, wherein the second housing and the support housing form the expansion cavity;
a heat dissipation apparatus disposed within the expansion cavity and comprising a heat dissipation channel isolated from the expansion cavity, wherein the heat dissipation channel is in a U shape and comprises:
an air inlet located at a first end of the U shape; and
an air outlet located at a second end of the U shape; and
an expansion system that is disposed in the expansion cavity and that is fastened and thermally coupled to the heat dissipation apparatus.

11. The communication device of claim 10, wherein the housing further comprises a first housing coupled to the support housing through sealing, wherein the first housing and the support housing form the lens cavity.

12. The communication device of claim 10, wherein the support housing further comprises:
a first side, wherein the air inlet and the air outlet are disposed on the first side; and
a second side, wherein the second housing is coupled to the support housing on the second side.

13. The communication device of claim 10, wherein the photographing device comprises a ventilation cover that covers the air vent and that is detachably and fixedly coupled to the support housing.

14. The communication device of claim 10, wherein the hollow cavity comprises a partition board, and wherein the partition board comprises:
a first side, wherein the air inlet is arranged on the first side; and
a second side, wherein the air outlet is arranged on the second side.

15. The communication device of claim 10, wherein the heat dissipation apparatus comprises a partition board configured to isolate the air inlet from the air outlet.

16. The communication device of claim 10, wherein the first end and the second end are configured to face downwards when the photographing device is in use.

17. The communication device of claim 10, wherein the heat dissipation apparatus comprises a fan configured to allow air to flow along the heat dissipation channel.

18. The communication device of claim 10, wherein the heat dissipation apparatus comprises:
a heat dissipation housing; and
a plurality of heat dissipation fins disposed in the heat dissipation housing and arranged at intervals.

19. The communication device of claim 18, wherein the heat dissipation channel and the expansion cavity are isolated from each other by the heat dissipation housing.

20. The communication device of claim 10, wherein the lens cavity and the expansion cavity are isolated from each other by a division in the housing.

* * * * *

UNITED STATES PATENT AND TRADEMARK OFFICE
CERTIFICATE OF CORRECTION

PATENT NO. : 12,052,483 B2
APPLICATION NO. : 17/727231
DATED : July 30, 2024
INVENTOR(S) : Xidong Yao, Yeren Wang and Bingbing Tong It is certified that error appears in the above-identified patent and that said Letters Patent is hereby corrected as shown below:

On the Title Page

Page 2, Column 2 Line 16 (56) References Cited, Foreign Patent Documents: "IN 105323437 A 2/2016" should read "CN 105323437 A 2/2016"

Signed and Sealed this
First Day of October, 2024

Katherine Kelly Vidal
*Director of the United States Patent and Trademark Office*